(12) United States Patent
Zhao

(10) Patent No.: US 8,067,486 B1
(45) Date of Patent: Nov. 29, 2011

(54) LOW VOC WATER-BASED EPOXY COATINGS

(75) Inventor: Wendy Zhao, Wilmette, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 89 days.

(21) Appl. No.: 12/692,932

(22) Filed: Jan. 25, 2010

Related U.S. Application Data

(60) Provisional application No. 61/147,212, filed on Jan. 26, 2009.

(51) Int. Cl.
*C08K 3/20* (2006.01)
*C08L 63/02* (2006.01)

(52) U.S. Cl. ......... 523/415; 523/420; 525/423; 525/523

(58) Field of Classification Search .................. None
See application file for complete search history.

(56) References Cited

U.S. PATENT DOCUMENTS

| | | | |
|---|---|---|---|
| 6,271,287 B1 | 8/2001 | Piechocki et al. | |
| 6,309,757 B1 * | 10/2001 | Carlblom et al. | 428/480 |
| 7,232,479 B2 | 6/2007 | Poulet et al. | |

OTHER PUBLICATIONS

Southern Clay Products, Product Bulletin/Optiflo TX-2164, (Optiflo H3300VF), 2010.
RHEOX, Inc., Bentone LT Rheological Additive, Jun. 1993.
Air Products, Epoxy Curing Agents, Technical Bulletin, Anquamine 401 Curing Agent, pp. 1-14, 2010.
Air Products, Epoxy Curing Agents and Modifiers, Anquamine 721 Curing Agent, Technical Datasheet, pp. 1-8, 2010.
The Dow Chemical Company, Product Information, XZ 92533.00 Experimental Solid Epoxy Resin Dispersion, pp. 1-3, 2010.

* cited by examiner

*Primary Examiner* — Robert Sellers
(74) *Attorney, Agent, or Firm* — Robert E. McDonald; Arthi K. Tirey; Vivien Y. Tsang

(57) ABSTRACT

An aqueous multi-component epoxy coating composition having less than 3% by weight of VOCs and curable upon admixing the components comprises (a) a first component of (i) a stable epoxy dispersion of an epoxy resin, from 5 to 20 weight percent of a mixture of surfactants comprising a low temperature nonionic surfactant having a molecular weight of from 1,000 to 7,000; a high temperature nonionic surfactant having a molecular weight of greater than 7,000 to 20,000 and an anionic surfactant, and (b) a second component of (i) a water miscible polyamine, wherein the composition further contains an associative thickener as well as thixotropic clay and/or a cellulosic thickener as additional thickener(s).

10 Claims, No Drawings

LOW VOC WATER-BASED EPOXY COATINGS

This application claims the benefit of U.S. Provisional Application No. 61/147,212, filed Jan. 26, 2009. This invention can provide water-based epoxy coatings having essentially zero VOC and without requiring the aid of additional solvents, acids, or diluents.

This invention relates to two-component zero VOC water-based epoxy coatings based upon a solid epoxy resin dispersion cured with a polyamine. Regulatory requirements minimizing the use of VOC (volatile organic compound) containing coatings are becoming increasingly more stringent, with some regulations requiring a maximum permissible level of VOC for certain coatings of 100 g/L. One approach to minimizing the levels of VOC for epoxy coatings has been to utilize water-based epoxy systems. These products can provide desirable performance including fast dry times, good corrosion resistance, good pot-life and low odor, and have replaced traditional solvent-based epoxy/polyamide coatings in many high-performance industrial applications. However, the VOC content of these water-based epoxies is typically in excess of 100 g/L so even though water-based, the usage of these coatings is increasingly limited by VOC regulations.

Historically the water-based epoxies used in conventional protective coating formulations are based two principal technologies, liquid epoxy self-emulsifying systems and solid epoxy dispersion systems. Typical epoxy self-emulsifying systems will have epoxy equivalent weights ranging from 175 to about 250 and are very rich in epoxy groups. The combination of concentrated epoxies and the amine hydrogens in the same emulsion particle provides coatings with high cross-link density and good chemical and abrasion resistance, but very short usable pot life, low flexibility and low impact resistance. These liquid epoxy systems can be formulated at very low VOC levels, but due to the dependence upon chemical reaction to increase the viscosity, the dry times are frequently very slow, often taking more than 6 hours to reach a tack free state.

Water-based epoxy systems based upon solid epoxy dispersions offer faster dry times due to coalescence of the epoxy particles through water and co-solvent evaporation. Historically, these solid epoxy resins have had epoxy equivalent weights ranging from about 500 to about 800 and provide coatings with lower cross-link density films that are more flexible, adhere better and have better impact resistance than the liquid epoxy systems. Pot life is typically much longer due to the lower concentration of epoxy groups and amine hydrogens. One of the major weaknesses of the epoxy dispersion type systems, however, is its tendency to form heterogeneous films with epoxy rich and amine rich domains due to incomplete coalescence. Therefore, to aid in processing and to overcome the poor flow and coalescence of the solid epoxy, co-solvents have to be added to the dispersion thereby eliminating any possibility of a zero VOC formulation.

This invention overcomes these problems of the prior art by utilizing a dispersion of a specially selected epoxide resin which uses internal surfactants incorporated into the epoxy resin. The epoxy resin is prepared in a manner which provides a very small particle size (typically less than about 2 microns and often less than about 0.5 microns), without adding solvents or reactive diluents. This epoxy resin, when combined with polyamine cross-linkers and suitable thixotropic agents provides epoxy coatings having excellent stability, pot life, cure rates and overall performance.

This invention relates to an aqueous multi-component epoxy coating composition curable upon admixing the components and comprising:
(a) a first component comprising a stable epoxy dispersion; and
(b) a second component comprising a water miscible polyamine;
and wherein the composition also comprises a thickener package comprising an associative thickener and an additional thickener selected from the group consisting of a thixotropic clay and a cellulosic thickener and mixtures thereof, and wherein the multi-component composition has less than 3% by weight of a volatile organic compound.

In many applications, the curable composition will have less than 1% by weight of a volatile organic compound and in many cases will be substantially free of any VOC. By "substantially free" is meant that no VOC materials, other than those that may be incidentally present in any raw materials incorporated into the coating, are intentionally added to solubilize or to reduce the viscosity of the coating composition. For many embodiments the composition will also have less than 1% by weight, of an added external flexibilizers. The coatings of this invention, even at very low VOC levels can be readily applied by any conventional means such as rolling, brushing or spraying.

Polyepoxides potential usefully in preparing the stable epoxy dispersion portion of this invention have an average of at least two epoxy groups per molecule and include aliphatic and aromatic polyepoxides, such as those prepared by the reaction of an aliphatic polyol or polyhydric phenol and an epihalohydrin. For some embodiments of this invention, a useful resin is a polyglycidyl ether of Bisphenol A. Methods of preparing representative polyepoxides and their stable aqueous dispersions are taught in U.S. Pat. No. 6,271,287.

The stable epoxy dispersion useful as part of the first component of the curable composition of this invention comprises a mixture of an epoxy resin and a low temperature nonionic surfactant, a high temperature nonionic surfactant, and an anionic surfactant which, in combination with the low temperature surfactant and the high temperature surfactant, reduces the interfacial tension value of the epoxy resin as compared to the interfacial tension value of the epoxy resin in the absence of the anionic surfactant; wherein the low temperature nonionic surfactant is characterized by having a molecular weight of not less than 1,000 and not more than 7,000, the high temperature nonionic surfactant is characterized by having a molecular weight of greater than 7,000 and not more than 20,000, and at least one of the following criteria is met:
  i) the weight-to-weight ratio of the high temperature nonionic surfactant to the anionic surfactant is greater than 3:1;
  ii) the weight-to-weight ratio of the sum of the low temperature nonionic surfactant and the high temperature nonionic surfactant to the anionic surfactant is greater than 4.5:1;
  iii) the total surfactant concentration is 5 to 20 weight percent, based on the weight of the total surfactants and the epoxy resin.

The stable aqueous dispersion of the epoxy resin can be readily prepared by the steps of:
  i) continuously merging into a disperser, and in the presence of an emulsifying and stabilizing amount of a surfactant mixture, a flowing stream of water flowing at a rate r1, and a flowing stream containing an epoxy resin flowing at a rate r2;

ii) mixing the streams with a sufficient amount of shear to form a high internal phase ratio emulsion; and iii) diluting the high internal phase ratio emulsion with water to form the stable aqueous dispersion;

wherein the surfactant mixture includes a low temperature nonionic surfactant and a high temperature nonionic surfactant, wherein the low temperature nonionic surfactant characterized by having a molecular weight of not less than 1,000 and not more than 7,000, the high temperature nonionic surfactant is characterized by having a molecular weight of greater than 7,000 and not more than 20,000; and where r2;r1 is in such a range that the volume average particle size of the dispersion is not greater than 2 microns.

These stable epoxy resin dispersions and their method of manufacture are disclosed in U.S. Pat. No. 6,271,287 issued Aug. 7, 2001, inventors Piechocki and Pate, the teaching of which is hereby incorporated in its entirety.

The polyamines which are useful in this invention include those having an average of at least two reactive amine groups per molecule. Polyamines are well known in the art and can be prepared by a variety of methods such as by the free radical polymerization of acrylic or other unsaturated monomers having primary or secondary amine functionality, or by the reaction of amines having at least two amino groups per molecule with a polycarboxylic acid to form polyamide amines, or by the reaction of primary amines with epoxy materials to produce secondary amine and hydroxylic functionality. The polyamines can also be polymeric or lower molecular weight materials such as piperazine, tetraethylenepentamine, 1,2-diaminopropane, etc. The polyamines could also be amine precursors which convert to amine groups under curing conditions, such as ketimines or aldimines. Anquamine® 401, an alkylated polyalkylene polyamine polymer from Air Products and Chemicals, Inc. has been useful in some embodiments of this invention. The equivalent ratio of amine hydrogen to epoxy may vary widely depending on the desired extent of crosslinking, although it is frequently useful to provide at least about 0.4 equivalents of amine hydrogen for each equivalent of epoxy. For some applications at least about 0.6 equivalents of amine hydrogen will be present for each equivalent of epoxy and for some applications the ratio of amine hydrogen to epoxy will be in the range of 0.6 to 1.0.

The two reactive components of the curable composition are normally kept separate and admixed immediately prior to application.

In order to provide the desired rheology to the coatings of this invention, it is desirable to incorporate an associative thickener and also to incorporate a second thixotropic agent selected from the group consisting of a thixotropic clay and a cellulosic thickener and mixtures thereof.

The curable compositions of this invention utilize a combination of at least two thickening or thixotropic agents. These agents can be added to the epoxy component or to the amine component or to both. For some applications adding one or more of the thickeners into each component can be useful. An associative thickener will be one part of the thickener package. Associative thickeners are known in the art and are water-soluble or water swellable polymers that have regions of hydrophobic and hydrophilic character on the molecule. Representative associate thickeners include acrylic polymers derived from acrylic acid or esters, hydrophobically modified polyether based polyurethanes, hydrophobically modified ethoxylated urethane resins generally comprising ethylene glycol units connected by urethane units and end-capped with hydrophobic groups, hydrophobically modified polyacrylamide and others. For some embodiments of this invention it is useful to utilize a hydrophobically modified ethylene oxide urethane (HEUR) as the associative thickener. In some embodiments it is useful to incorporate the associative thickener into each of the components. Typically the associative thickener will be present at an amount to provide at least about 0.1% by weight, based upon the total weight solids of the curable composition. For some applications the associative thickener will be present at a level of at least about 0.5% based upon the total weight solids, and for many applications will be present at a level of about 0.5 to about 3.0% by weight of the total weight solids.

In addition to the associative thickener, at least one other thickener or thixotrope selected from the group consisting of thixotropic clays and cellulosic thickeners and mixtures thereof is also normally added to the coatings of this invention. Thixotropic clays, such as the bentonite and attapulgite clays are well known in the art. Representative useful commercial thixotropic clays include those sold under the Bentone trademark by Elementis.

Cellulosic thickeners can also be used to replace some or all of the thixotropic clay. Cellulosic thickeners are well known in the art and include alkyl celluloses, hydroxy alkyl celluloses, alkyl hydroxy alkyl celluloses, carboxy alkyl celluloses, carboxy alkyl hydroxy alkyl celluloses and alkoxy celluloses. If desired, the cellulosics can be made more organophillic such as by treating the clay with quarternary ammonium compounds as is known in the art. Representative cellulosics include methylcellulose, ethyl cellulose, hydroxy ethyl cellulose, hydroxy propyl cellulose, hydroxy propyl methylcellulose, carboxy methylcellulose, carboxy methyl hydroxyethyl cellulose and ethyl hydroxy ethyl cellulose. Typically the clay and/or cellulosic thickener will be present at an amount to provide at least about 0.1% by weight, based upon the total weight solids of the curable composition. For some applications the clay and/or cellulosic will be present at a level of at least about 0.4% based upon the total weight solids, and for many applications will be present at a level of about 0.5 to about 2.5% by weight of the total weight solids. Representative useful commercially available cellulosics include those sold under the Natrosol trademark form Rohm and Haas.

The following examples have been selected to illustrate specific embodiments and practices of advantage to a more complete understanding of the invention. Unless otherwise stated, "parts" means parts-by-weight and "percent" is percent-by-weight".

EXAMPLE I

A stable epoxy coating having essentially zero VOC was prepared by preparing the individual components A and B and then mixing 4 parts of Part A by volume with 1 part of Part B by volume.

| Material | Parts by Weight |
|---|---|
| Part A | |
| epoxy dispersion[1] | 544.0 |
| coalescing agent[2] | 4.0 |
| water | 96.3 |
| defoamer[3] | 1.2 |
| flash rusting preventative | 0.8 |
| rheology modifier[4] | 1.2 |
| wetting agent[5] | 4.0 |

-continued

| Material | Parts by Weight |
|---|---|
| TiO2 | 160.0 |
| deareator[6] | 1.2 |
| surfactant[7] | 1.6 |
| associative thickener[8] | 10.4 |
| | 825.0 |
| Part B | |
| cure agent[9] | 76.0 |
| water | 89.2 |
| defoamer[3] | 0.8 |
| deareator[6] | 0.8 |
| associative thickener[8] | 4.0 |
| | 171.0 |

[1]Bisphenol A based epoxy resin dispersion from The Dow Chemical Company as taught in U.S. 6,271,287, and having an epoxide equivalent weight (on solids) of 475-500, 47% NVM in water
[2]Pluracoat ® CA120 aromatic alkoxylate from BASF
[3]Tego ® Foamex 810
[4]Bentone ® LT organically modified clay
[5]Disperbyke ®-190 from Byk-Chemie GmbH
[6]Tego ® Airex 901
7Surfynol ® 420 acetylenic glycol surfactant
[8]Optiflo ® H3300VF hydrophobically modified nonionic polymer from Southern Clay Products (40% NVM in water)
[9]Anquamine ® 401 water soluble polyamine polymer The coating obtained in Example I is a stable water based curable composition substantially free of organic solvents, acids or diluents and can provide high gloss, fast cure, long pot life (5 hours or more @ 770 F/50% R.H.). Upon curing, the coating of Example I provided excellent resistance to moisture and to water and chemicals.

| Mechanical Properties | |
|---|---|
| Gloss ASTM D523 | >90 @ 60° |
| Flexibility ASTM D522 | Pass 1/8" in. mandrel |
| Direct Impact ASTM D2794 | 100 in. lbs. |
| Abrasion Resistance ASTM D4060: 1000 cycles, 1 kg load | 150 mg loss |
| Pencil hardness; 7 day cure | H |
| Tape Adhesion ASTM D3359; 7 day cure; 1 coat over steel | 5B |
| Patti Adhesion ASTM D4541; 7 day cure; 1 coat over concrete | 550 psi |

| Drying Schedule | | | | |
|---|---|---|---|---|
| Properties | | Zero VOC W/B Epoxy Topcoat of Example 1 | | |
| Drying Time @ 4.0 mils wet, 50% RH | | 50° | 77° F. | 120° F. |
| To Touch: | | 1 hour | 45 minutes | 25 minutes |
| To Handle: | | 5 hours | 4 hours | 2 hours |
| To Recoat: | minimum | 8 hours | 6 hours | 3 hours |
| | Maximum | 30 days | 30 days | 30 days |
| To Cure: | | 7 days | 7 days | 3 days |
| Pot Life: | | 8 hours | 5.5 hours | 3.5 hours |
| Sweat-in-time: | | 30 minutes | None | None |

When compared to a commercially available water-borne epoxy Tile Clad® B73W111/B73V100, the coating of Example I showed superior gloss and color retention at 250 and 500 hours of QUV exposure (ASTM D4587), as well as superior weathering (15 cycles—ASTM D5894).

The coatings of this invention may typically be applied to any substrate such as concrete, and metal substrates, particularly ferrous metals. In certain embodiments, the substrates optionally may be coated with a primer prior to application of the coating as is well known in the art. For some embodiments, useful primers would include acrylics, epoxies and zinc-rich primers. The primers may be solvent or water borne, although for some applications water borne primers may be especially useful to minimize VOC of the entire system.

The coatings used in this invention may include at least one pigment. Although the pigments may be added to either the epoxy component or the amine component, for some embodiments of this invention, it is useful to add the pigments to the epoxy component. Pigments such as talcs, silicas, titanium dioxide, carbon black and other known organic or inorganic pigments can be incorporated. Additives such as wetting agents, defoamers, coalescing agents, etc. can also be incorporated. It is also possible to incorporate other water miscible polymers if desired. In order to minimize the VOC content as much as possible, however, it is often desirable to avoid incorporating VOC type solvents as much as practical.

While this invention has been described by a specific number of embodiments, other variations and modifications may be made without departing from the spirit and scope of the invention as set forth in the appended claims.

The invention claimed is:
1. An aqueous multi-component epoxy coating composition curable upon admixing the components and comprising:
 (a) a first component comprising:
  (i) a stable epoxy dispersion comprising a mixture of an epoxy resin and a low temperature nonionic surfactant, a high temperature nonionic surfactant, and an anionic surfactant which, in combination with the low temperature surfactant and the high temperature surfactant, reduces the interfacial tension value of the epoxy resin as compared to the interfacial tension value of the epoxy resin in the absence of the anionic surfactant; wherein the low temperature nonionic surfactant is characterized by having a molecular weight of not less than 1,000 and not more than 7,000, the high temperature nonionic surfactant is characterized by having a molecular weight of greater than 7,000 and not more than 20,000, and at least one of the following criteria is met:
   (aa) the weight-to-weight ratio of the high temperature nonionic surfactant to the anionic surfactant is greater than 3:1;
   (bb) the weight-to-weight ratio of the sum of the low temperature nonionic surfactant and the high temperature nonionic surfactant to the anionic surfactant is greater than 4.5:1;
   (cc) the total surfactant concentration is 5 to 20 weight percent, based on the weight of the total surfactants and the epoxy resin; and
 (b) a second component comprising:
  (i) a water miscible polyamine
and wherein the composition also comprises an associative thickener and an additional thickener selected from the group consisting of a thixotropic clay and a cellulosic thickener and mixtures thereof; and wherein the composition has less than 3% by weight of VOCs.
2. The epoxy coating composition of claim 1 wherein the composition has less than 1% by weight VOCs.
3. The epoxy coating composition of claim 1 wherein the composition is essentially 0% VOC.

4. The epoxy coating composition of claim 1 wherein the epoxy resin has an epoxy equivalent weight of at least 400 grams per equivalent on a solids basis.

5. The epoxy coating composition of claim 1 wherein the epoxy resin has an epoxy equivalent weight of between 400 and 800 grams per equivalent on a solids basis.

6. The epoxy coating composition of claim 1 wherein the epoxy resin and the polyamine are present at a level to provide at least 0.4 equivalents of amine hydrogen for each equivalent of epoxy.

7. The composition of claim 1 wherein the additional thickener is a thixotropic clay.

8. The composition of claim 1 wherein the additional thickener is a cellulosic thickener.

9. The composition of claim 1 wherein both the first component and the second component comprise an associative thickener.

10. The composition of claim 1 wherein the first component comprises at least one pigment.

* * * * *